H. BATT.
HOISTING MACHINE.
No. 192,891. Patented July 10, 1877.
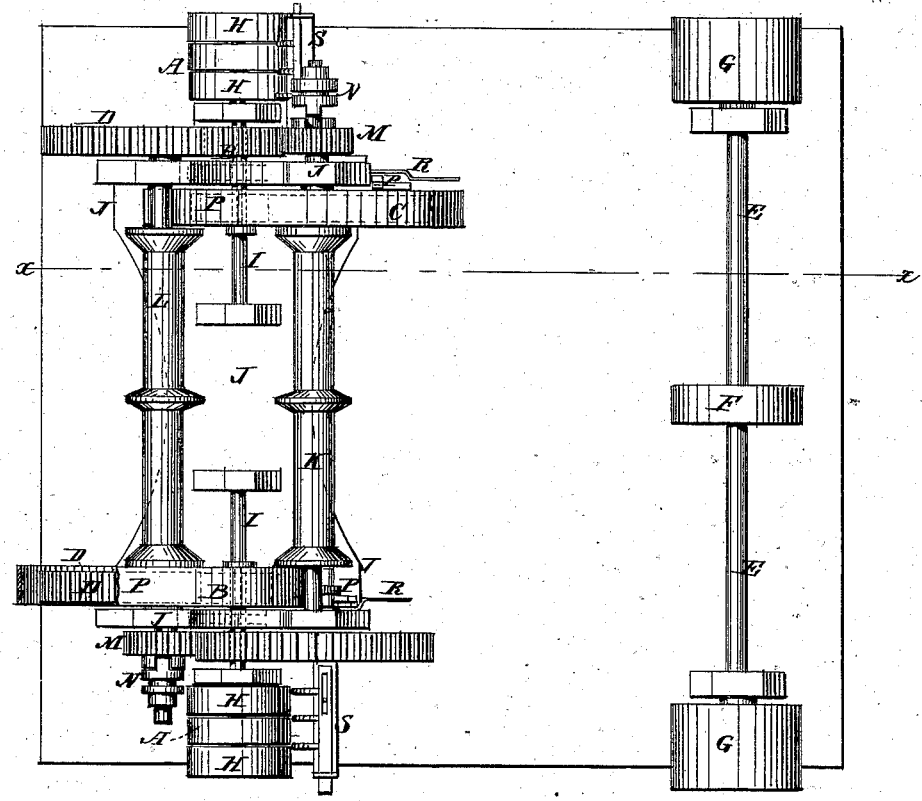
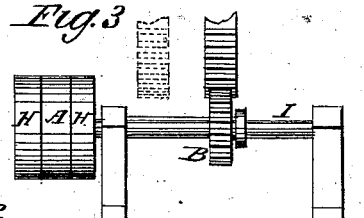
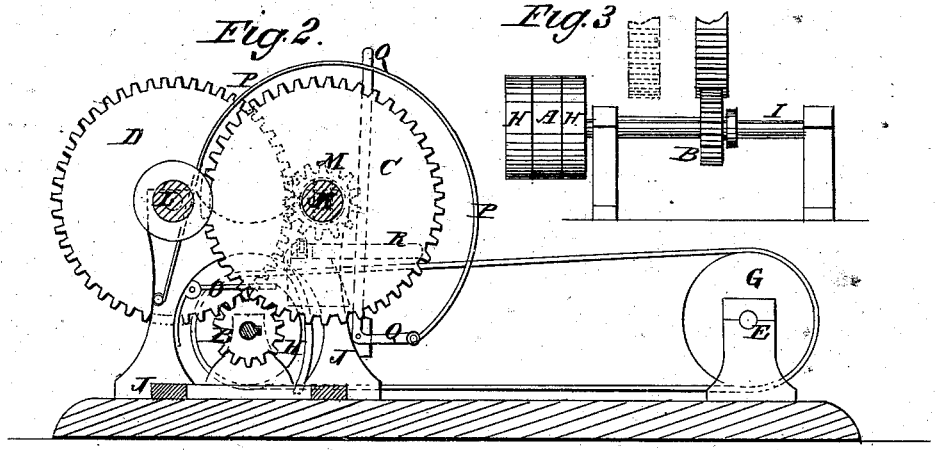
WITNESSES:
INVENTOR:
H^m Batt.
BY
ATTORNEYS.

UNITED STATES PATENT OFFICE.

HENRY BATT, OF KENTISH-TOWN, LONDON, ENGLAND, ASSIGNOR TO LEONARD G. TABRAHAM, OF BOSTON, MASSACHUSETTS.

IMPROVEMENT IN HOISTING-MACHINES.

Specification forming part of Letters Patent No. 192,891, dated July 10, 1877; application filed May 12, 1877.

*To all whom it may concern:*

Be it known that I, HENRY BATT, of Kentish-Town, London, England, have invented a new and Improved Hoisting-Machine, of which the following is a specification:

Figure 1 is a plan view of my improved machine. Fig. 2 is a cross-section of the same, taken through the line $x\ x$, Fig. 1. Fig. 3 is a detail view of the sliding-gear wheel and the fast and loose pulleys.

The object of this invention is to furnish an improved hoisting-machine, which shall be simple in construction and convenient in use, being readily adjusted to work with speed or with power, as may be desired.

The invention consists in the combination of the fast and loose pulleys, the short shafts, the sliding-gear wheels, the large gear-wheels, and the clutches with each other, as hereinafter fully described.

E is the driving-shaft, to which is attached a pulley, F, to receive the belt by which the machine is driven from any convenient power.

To the ends of the shaft E are attached two wide pulleys, G, each of which is designed to receive a straight belt and a crossed belt, which belts pass around the loose pulleys H placed upon the short shafts I, and one upon each side of the fixed pulleys A attached to the said short shafts I, so that by shifting the straight or the crossed belts to the fixed pulleys A the shafts I may be revolved in one or the other direction, as may be desired.

The shafts I revolve in bearings attached to the bed-plate or frame J of the machine, and upon their inner parts are placed small gear-wheels B, which are connected with said shafts by tongues and grooves, so as to be carried with said shafts in their revolution while being allowed to slide freely upon them.

To the frame J are pivoted two parallel drums, K L, one or each of which is provided with two hoisting-chains, the one winding up as the other unwinds.

To the end parts of each of the drums K L are attached two large gear-wheels, C D. The two gear-wheels C of the drum K are placed the one upon the outer side and the other upon the inner side of the bearings, in which the journals of the drum K revolve. The corresponding gear-wheels D of the drum L are placed the one upon the inner side and the other upon the outer side of the bearings in which the journals of the drum L revolve.

The drums K L and the gear-wheels C D are so arranged that the inner sides of the gear-wheels C D upon each side may overlap each other, the brackets of the frame J being between them in such a way that the gear-wheels B, by being slid upon the shafts I, may be made to mesh with either of said wheels C D, or may be placed midway between said wheels C D, meshing with neither.

Upon the journal of each of the drums K L are placed small gear-wheels M, the teeth of which mesh into the teeth of the outer gear-wheels C D, and which are made to move with said journals by clutches N sliding upon their outer ends.

O are forks, hinged to the frame J, to drop over or at either side of the gear-wheels B, to keep them in place when between the gear-wheels C D, and when in gear with either of said wheels.

P is the brake-straps for controlling the movement of the apparatus, and which are attached at one end to the frame J. The brake-straps P pass over the inner wheels C D, and their outer ends are attached to the short arms of the bent levers Q, which are pivoted at their angles to the frame J, or to supports attached to said frame, and are provided with catch-bars R to hold them in place when adjusted.

S are the belt-shippers, by which the belts are shifted upon the pulleys H A H.

By this construction, when the gear-wheels B are in gear with the gear-wheels C D, and the gear-wheels M are clutched to the journals of the drums K L, the machine will work with great power and a slow movement. When the gear-wheels B are in gear with the gear-wheels C, and the gear-wheels M are clutched to the journals of the drums K L, the machine will work faster, but with less power. When the gear-wheels M are left loose and the gear-wheels B are in gear with either the gear-wheels C or D the machine will work as a single-purchase hoist, and with medium power and speed.

Having thus described my invention, what I claim as new, and desire to secure by Letters Patent, is—

The combination of the fast and loose pulleys H A H, the shafts I, the sliding gear-wheels B, the gear-wheels C D, the drums K L, the loose gear-wheels M, and the clutches N, with each other, substantially as herein shown and described.

HENRY BATT.

Witnesses:
 STUART CHARLES FERIN,
 JAMES MAY.